Dec. 2, 1930.  F. L. YOUNG  1,783,324
EXTENSION CLUTCH CONTROL FOR TRACTOR EQUIPMENT
Filed Dec. 9, 1927
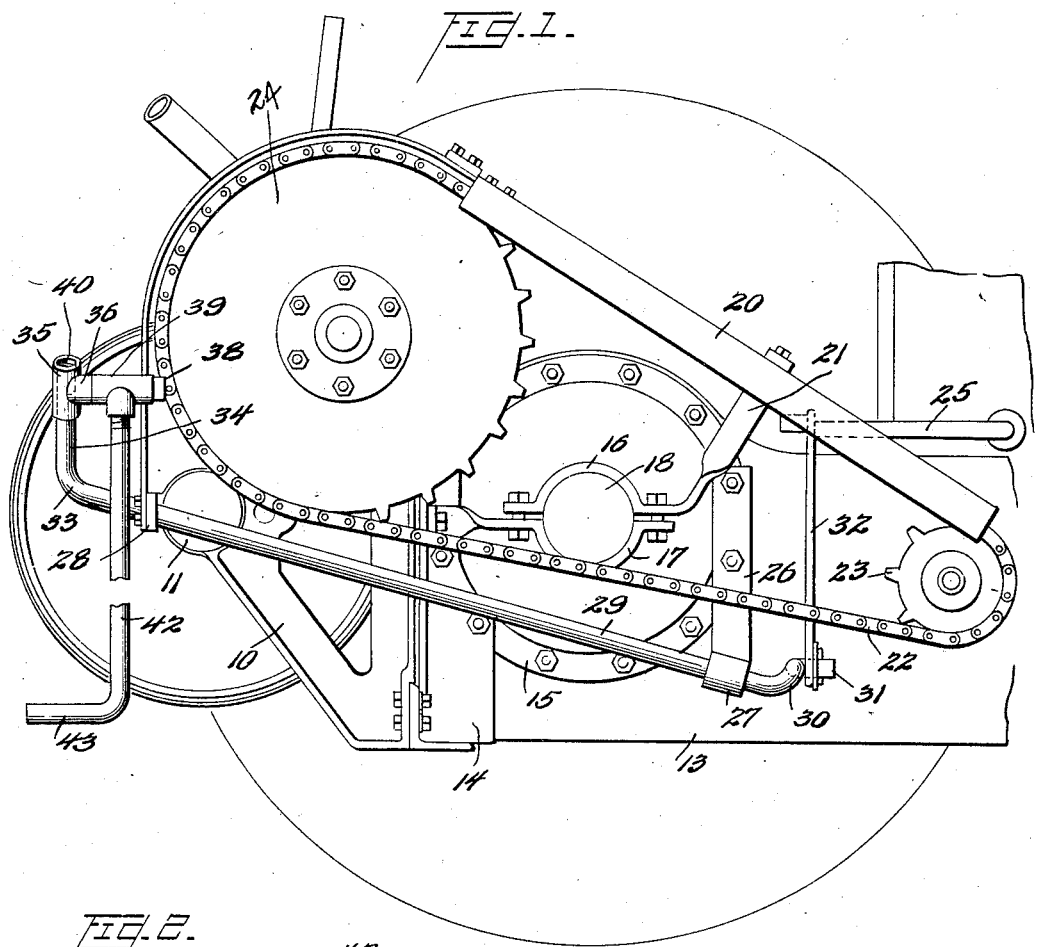
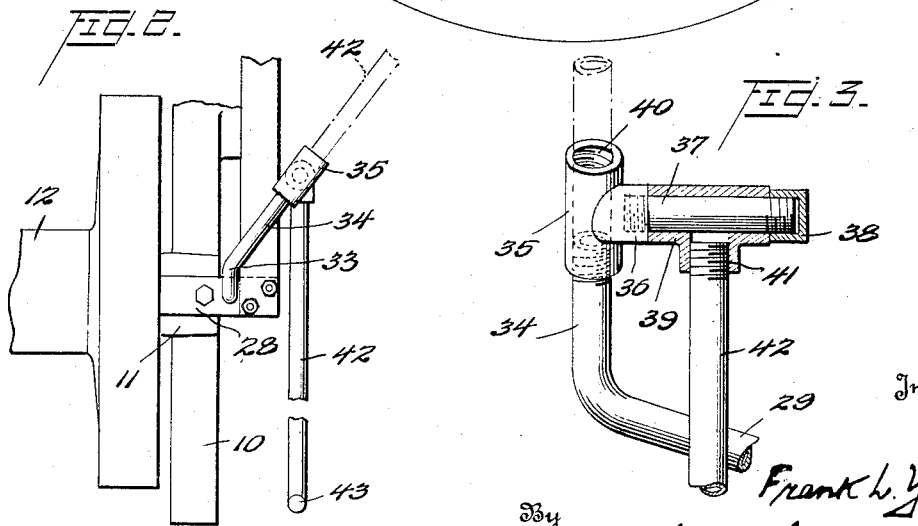
Inventor
Frank L. Young
By Wm D Shoemaker
Attorney Patented Dec. 2, 1930

1,783,324

UNITED STATES PATENT OFFICE

FRANK L. YOUNG, OF WASHINGTON, DISTRICT OF COLUMBIA, ASSIGNOR TO WILLIAM D. SHOEMAKER, OF WASHINGTON, DISTRICT OF COLUMBIA

EXTENSION CLUTCH CONTROL FOR TRACTOR EQUIPMENT

Application filed December 9, 1927. Serial No. 238,840.

This invention relates to a winch and more particularly to a subcombination of winch elements comprising an extension clutch control. In the industrial uses of the modern gas tractor equipment is employed to change the tractor into stationary machinery employing the power plant of the tractor as the source of power. One such piece of equipment is shown in the drawings and comprises a frame attached to the rear of the tractor supporting a winding drum and means for driving the winding drum from the belt pulley shaft of the tractor. The tractor clutch is used as a means for cutting off the drive of the power plant and it is necessary to control the clutch from a point near the rear of the tractor.

The object of the invention is to provide an extension clutch control adapted for use in machinery of this kind which can be used either as a foot control or a hand lever control.

Other objects and advantages of the invention will hereinafter appear in the following description, and the novel features thereof will be particularly pointed out in the appended claims.

Like letters of reference indicate like parts throughout the drawing in which

Figure 1 is a side elevation of the rear end of a tractor showing the extension clutch control in place, Figure 2 is a front elevation of the end of the winding drum, and Figure 3 is a detail of the interchangeable connection in the clutch control.

The side frame element 10 has formed integral with it the bearing block 11 in which is mounted the spool 12. The tractor body 13 carries the winch frame, which is attached to the differential housing 15 of the tractor through the medium of the supporting angles 14. The clamp members 16 and 17 surrounding the axle housing 18 form an additional connection between the tractor and the frame 10 at each side of the tractor. The chain guard 20 is supported from one of the clamp elements by the strut 21. The chain 22 transmits power from the drive sprocket 23 to the large sprocket 24 on the winding drum.

The parts just described are elements of what is known in the field of Fordson equipment as the Myers winch, and in this application no attempt will be made to describe in detail these parts or their conjoint junctions. These are more fully described in a copending application and in patents heretofore granted to Harry S. Myers.

The numeral 25 indicates a tractor clutch pedal which is usually operated from the seat on the rear of the tractor (not shown). Depending from the differential housing is a strap 26 carrying a bearing 27 at its lower end, and the frame of the winch is provided with a connector 28 in which is provided a second bearing as indicated in Figure 2. In these two bearings a control rod 29 is mounted and the forward end of that control is bent as at 30 to provide a crank 31 out of alignment with the rod 29. This end is connected by a suitable link 32 with the tractor clutch pedal, and it will be appreciated that when the rod 29 is rotated to bring the crank 31 to a lower level the clutch pedal 25 will be depressed.

The parts just described while differing in minor details are substantially those shown in the patent to Harry S. Myers numbered 1,418,265, dated May 30, 1922, to which reference is made for a more complete and exhaustive discussion of their operation.

The rear end of the rod 29 is bent upwardly and outwardly as shown at 33, forming a stub 34 on which is screwed a plain T 35, in the opening 36 of which is screwed a short shaft 37. On the end of this shaft is a cap 38 and on the body of the shaft is mounted a second plain T 39 which is free to revolve on the shaft 37.

It will be appreciated that an opening 40 is provided at one end of the T 35 and another opening 41 centrally of the T 39. If it is desired to have an extension clutch control operated by the use of the hand of the operative, an operating element in the form of a rod 42 having bent end 43 is screwed into the opening 40 as shown in dotted lines in Figures 2 and 3. In such an arrangement the extension clutch control will function in all respects similar to that described in Harry S. Myers' patent hereinbefore referred to.

But if it is desired to have a foot operated extension control the rod 42 is screwed into the opening 41 of the T 39, which will permit it to swing freely with the T 39 on the shaft 37 while the end 43 will constitute the pedal to be pressed upon by the foot. It will be obvious that while the lever rod 42 will be permitted to swing, it will be limited in its movement toward the winding drum by that portion of the rod 29 projecting beyond the connector 28 and this will act as a safeguard against too great a movement of the operator's foot toward the winding drum.

From the description the function of the individual parts will be clear and the function of the general subcombination will likewise be understood. The depending lever rod 42 is, in the position shown in Figure 2, off the turning center of the rod 29 and a downward pressure on the end 43 will cause a turning movement of the stub 34 and a consequent depression of the clutch pedal of the tractor through the link 32. During this turning movement, the rod 42 will be maintained in a vertical position due to the fact that the T 39 rotates freely on the shaft 37.

When the parts are in either hand or foot control position, the T 39 constitutes another or auxiliary point from which the clutch may be operated. In other words, by pressing downward with the hand (or with the foot) on the T 39, the clutch control may be operated and if the operative is slightly elevated in position, he might depress the clutch control by pressing upon the T 39 with the foot. This facility is important when it is understood in what a variety of situations a tractor equipped with a winch may be used. Oftentimes it is used in open country and in rainy weather when the tractor wheels rest in ruts or depressions in the ground at which time the tractor and winding drum are rather low. In that position of the machine it is not feasible to use the lever rod 42 in the position shown in Figure 1 but it is also desirable to have a foot control of the clutch.

It will be appreciated that the extension clutch control is made up of stock materials, rods and fittings, which may be readily procured at any hardware store. This is desirable in order that repair parts may be promptly obtained in case of breakage. In addition, the assembling of these parts in the manner described gives a wide range of operating capabilities.

While the invention has been described in connection with a rear end winch it will be appreciated that it is equally adapted to a front end winch or even to machinery other than winches. Changes may be made in the details of construction without departing from the spirit of the invention as defined in the appended claims.

What is claimed is:

1. In a piece of equipment adapted to be used in connection with a gas tractor, an extension clutch control for the tractor clutch comprising a rod mounted for oscillation to depress the tractor clutch pedal, and means for oscillating the rod comprising a coupling secured to said rod and having a pair of points of connection and an operating element adapted to be connected to said coupling at either of said points to form selectively a hand or foot control.

2. In a piece of equipment adapted to be used in connection with a gas tractor, an extension clutch control for the tractor clutch comprising an oscillatory rod, one end of which is provided with means for depressing the clutch pedal during the movement of the rod, an operating element for oscillating said rod, and means for connecting said operating element to said rod either in linear extension of the rod to form a hand control or as a pendant extension from said rod to form a foot control.

3. In a piece of equipment adapted to be used in connection with a gas tractor, an extension clutch control for the tractor clutch comprising an oscillating rod, one end of which is provided with means for depressing the clutch pedal during the movement of the rod, an operating element for oscillating said rod, and means connecting said operating element to said rod either in linear extension of the rod or as a pendant extension from said rod to form individual hand or foot controls, said means comprising a member providing an auxiliary handhold or foot rest for use in operating the extension clutch control.

4. An extension clutch control for gas tractors comprising a rod suitably formed, bearinged and positioned to cause one end thereof to depress the tractor clutch as a result of oscillating said rod, the other end of the rod bent to form a stub, a T on the end of said stub, a short shaft fitting the side opening of said T, a second T loosely fitted on said short shaft, a cap on the end of the short shaft to hold said second T on said shaft, and an operating element adapted to be secured in the remaining opening in either the first or the second T.

In testimony whereof I affix my signature.

FRANK L. YOUNG.